US012692922B2

(12) United States Patent
Weichert

(10) Patent No.: US 12,692,922 B2
(45) Date of Patent: Jul. 28, 2026

(54) BRAKE PAD

(71) Applicant: HL MANDO CORPORATION, Pyeongtaek-si (KR)

(72) Inventor: Florian Weichert, Wiesbaden (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 384 days.

(21) Appl. No.: 17/705,211

(22) Filed: Mar. 25, 2022

(65) Prior Publication Data

US 2022/0307565 A1 Sep. 29, 2022

(30) Foreign Application Priority Data

Mar. 26, 2021 (DE) ...................... 10 2021 107 745.1
Mar. 23, 2022 (DE) ...................... 10 2022 202 856.2

(51) Int. Cl.
F16D 69/00 (2006.01)
F16D 65/095 (2006.01)

(52) U.S. Cl.
CPC ........... F16D 69/00 (2013.01); F16D 65/095 (2013.01); *F16D 2069/004* (2013.01)

(58) Field of Classification Search
CPC .. F16D 69/00; F16D 65/095; F16D 2069/004; F16D 65/04; F16D 55/225; F16D 65/092; F16D 69/04; B60T 1/06
See application file for complete search history.

(56) References Cited

U.S. PATENT DOCUMENTS

| | | | |
|---|---|---|---|
| 4,287,978 A * | 9/1981 | Staub, Jr. .............. | F16D 25/123 192/113.36 |
| 4,396,100 A * | 8/1983 | Eltze ..................... | F16D 65/127 188/71.6 |
| 6,119,828 A | 9/2000 | Parsons | |
| 2017/0175838 A1 | 6/2017 | Muffley et al. | |
| 2017/0219031 A1 | 8/2017 | Hoffrichter | |
| 2021/0123489 A1* | 4/2021 | Adamczak ............ | F16D 65/092 |

FOREIGN PATENT DOCUMENTS

| | | | | |
|---|---|---|---|---|
| CN | 101749346 A | 6/2010 | | |
| DE | 198 46 887 A1 | 4/2000 | | |
| DE | 10 2015 108 049 A1 | 11/2016 | | |
| EP | 1798439 A1 * | 6/2007 | ........... | F16D 65/092 |
| JP | 2007-71353 A | 3/2007 | | |

OTHER PUBLICATIONS

German Patent No. DE 102015011973 to Orgler published on Mar. 16, 2017.*

(Continued)

*Primary Examiner* — Pamela Rodriguez
(74) *Attorney, Agent, or Firm* — Hauptman Ham, LLP

(57) ABSTRACT

The invention relates to a brake pad for a disk brake, comprising a backplate, and a friction layer with a friction surface configured for engaging with a brake disk. The friction layer has a pressure groove, the pressure groove extending from a leading edge of the friction layer. The pressure groove is delimited by the friction surface on an outer circumferential side, and on in inner circumferential side, and on a trailing side, and is open on a leading side.

9 Claims, 3 Drawing Sheets

(56)                    References Cited

OTHER PUBLICATIONS

Translation of German Patent No. DE 102015108049 obtained from
website: https://worldwide.espacenet.com on May 6, 2024.*
German Office Action dated Feb. 3, 2023 for corresponding German
Patent Application No. 10 2022 202 856.2, English Machine Trans-
lation, 8 pages.
Office Action issued on Aug. 12, 2025, for corresponding Korean
Patent Application No. 10-2022-0037271, along with an English
machine translation (9 pages).
German Office Action dated Jun. 27, 2024 for corresponding
German Patent Application No. 10 2022 202 856.2, English Machine
Translation, (36 pages).

* cited by examiner

Fig. 1
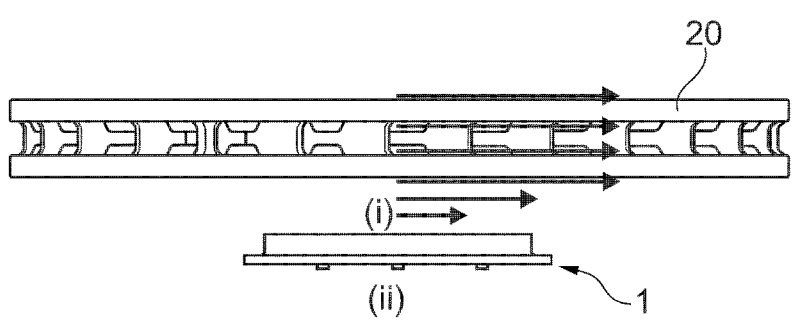
Fig. 2
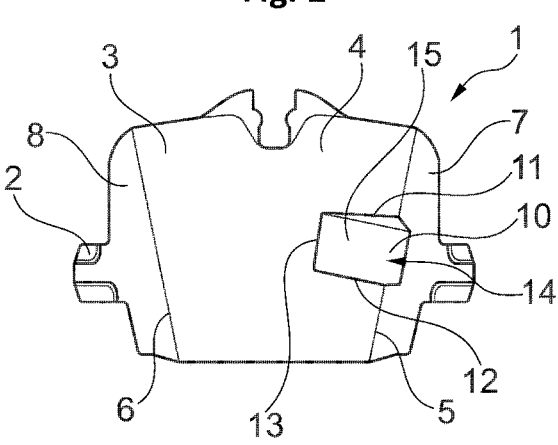
Fig. 3a
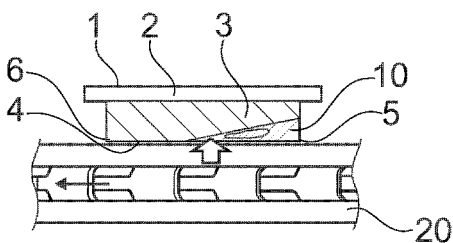
Fig. 3b
Fig. 3c
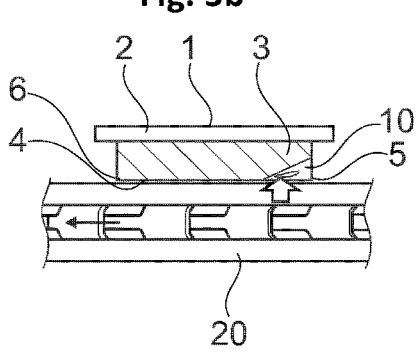
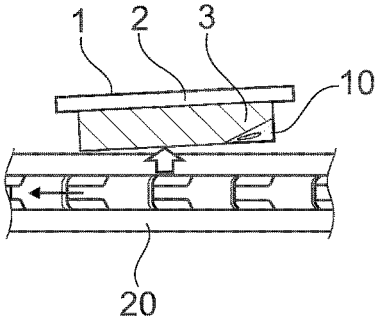

2
3  4  15  10
2
11  2  3  7
10
3
10
13  12  14

2
4  3  15  10
2
2  3
7
10
3
10
13  14

2
3  10
11  2  3
7
10
2
3
10
12  16
16

Fig. 5a
Fig. 5b
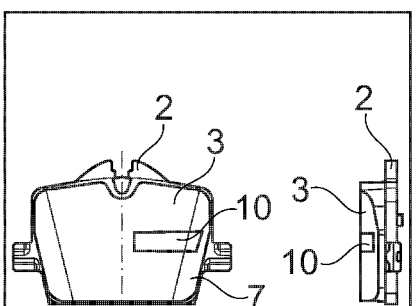
Fig. 5c
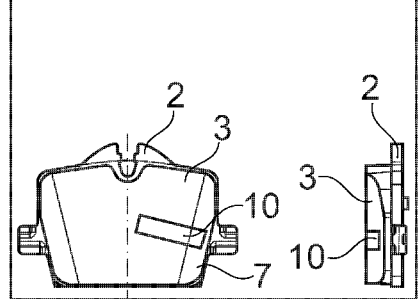

BRAKE PAD

CROSS-REFERENCE TO RELATED APPLICATIONS

This application is based upon and claims the benefit of priorities from German Patent Application No. 10 2021 107 745.1, filed on Mar. 26, 2021, and German Patent Application No. 10 2022 202 856.2, filed on Mar. 23, 2022, in the German Patent and Trademark Office, the entire contents of which are incorporated herein by reference.

TECHNICAL FIELD

The application relates to a brake pad.

BACKGROUND ART

In disk brakes, which are commonly used in vehicles, it is not only desirable to have good stopping performance, but, in order to avoid overheating or wasting of energy, it is also important to have little or no friction when the brake is loosened, i.e. in an off-braking state, in particular, immediately after the brake is released. When the brake is not applied, the piston or the brake pad should be well-separated from the contact surface of the brake disk and immediately after the brake is released, the piston should adopt said separated position as quickly as possible.

Known brake pads for vehicle brakes comprise a friction layer which may include chamfers or J-cuts for improving noise, vibration and harshness (NVH).

SUMMARY

In vehicle brakes, pad suction may occur, which can lead to residual drag. When the brake disk rotates, pressure conditions between the brake disk and the brake pad may result in a force which pushes the brake pad towards the disk.

The present invention is aimed at reducing said residual drag.

This is achieved by a brake pad according to claim 1. Optional features are defined in the dependent claims and disclosed in the following description and the figures. It is also achieved by a brake system comprising the brake pad, and by a method for using the brake pad.

Accordingly, a brake pad for a disk brake comprises a backplate and a friction layer. The friction layer has a friction surface configured for engaging with a brake disk. The friction layer has a pressure groove which extends from a leading edge of the friction layer. The pressure groove is delimited by the friction surface on an outer circumferential side, and on in inner circumferential side, and on a trailing side. The pressure groove is open on a leading side.

The inventor found out that the pressure groove, which is closed on three sides as described above, and open on the leading side, enables advantageous pressure conditions which result in a force that acts to drive the brake pad away from the brake disk. In particular, the resulting force occurs as a result of pressure conditions which prevail when the brake pad is provided near a rotating brake disk.

Specifically, the brake pad may be a brake pad for a road vehicle, in particular a car.

This application also relates to a brake system comprising the brake pad and the brake disk. The application also relates to a method for using the brake pad in order to create pressure conditions which counteract residual drag.

The pressure groove may extend over at least 10% or at least 20% or at least 30% or at least 40% of a length of the friction surface. The length of the friction surface is measured for instance from the leading edge to a trailing edge. Additionally or alternatively, the pressure groove may extend over at most 80% or at most 70% or at most 60% or at most 50% of the length of the friction surface.

The pressure groove may have a width of at least 10% or at least 15% of a width of the friction surface and/or of at most 50% or at most 40% of a width of the friction surface. The width of the friction surface is for instance measured from an inner circumferential edge to an outer circumferential edge.

Dimensions of the above-described type may be useful for establishing an advantageous pressure, while keeping the friction surface intact for creating sufficient stopping performance.

A maximum depth of the pressure groove may be at least 10% or at least 20% of a thickness of the friction layer. Additionally or alternatively, a maximum depth of the pressure groove may be up to a full thickness of the friction layer, or at most 90% of the thickness of the friction layer, or at most 80% of a thickness of friction layer.

At least a portion of a base surface or all of the base portion of the pressure groove may be parallel to the friction surface. In those cases, the portion or all of the pressure groove may have a constant depth.

At least a portion of the base surface or all of the base surface of the pressure groove may be sloped with respect to the friction surface. For instance, the portion or all of the base surface may be provided at a constant angle with respect to the friction surface. For instance, the depth of the pressure groove may decrease, in particular continuously decrease, from the leading side of the pressure groove towards the trailing side of the pressure groove.

It should be noted that the pressure groove may be provided in friction layers which have additional chamfers, for instance for improving NVH. The pressure groove may for instance extend into an area of a leading chamfer.

The pressure groove may be arranged circumferentially centrally between an outer circumferential edge and an inner circumferential edge of the friction layer. The pressure groove may instead be arranged off center, closer to the outer circumferential edge or closer to the inner circumferential edge.

The pressure groove may have a chamfered side area at its inner circumferential side and/or at its outer circumferential side. The chamfered side area(s) may be sloped portions, wherein the depth of the pressure groove decreases at an angle from the base surface towards the friction surface delimiting the respective side(s) of the pressure groove. The pressure groove may instead have a step profile on the side(s).

The pressure groove may in a tangential direction from the leading edge towards a trailing edge. The pressure groove may instead extend from the leading edge at an angle with respect to a tangential direction, wherein the pressure groove may be angled circumferentially outward or circumferentially inward.

BRIEF DESCRIPTION OF THE DRAWINGS

Exemplary embodiments of the invention are shown in the Figures.

Therein

FIG. 1 shows a pressure condition between a brake pad and a brake disk,

FIG. 2 shows a brake pad with a pressure groove,

FIGS. 3*a-c* show brake pads with pressure grooves which are being released from a brake disk, FIGS. 5*a-c* show brake pads with pressure grooves having different circumferential orientations.

DETAILED DESCRIPTION OF EMBODIMENTS

Figures 4A, 4B, 4C:
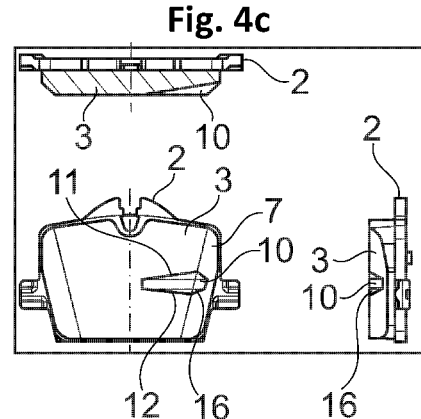
FIGS. 4*a-c* show brake pads with pressure grooves having different depth profiles.

FIG. 1 illustrates a pressure condition between a brake pad 1 and a brake disk 20. Pad suction occurs and leads to residual drag: The brake disk 20 rotates, as indicated by the arrows. As a consequence, air between the brake disk 20 and the brake pad 1 moves at an air speed. Higher air speed results in a higher dynamic pressure and, in consequence a lower static pressure, according to Bernoulli's equation. On a friction side of the brake pad 1, in area (i) as indicated in FIG. 1, there is a lower pressure than the ambient pressure, which prevails in area (ii), on a backplate side of the brake pad 1. There is a resulting force which is pushing the brake pad 1 towards the brake disk 20.

The brake pad 1 illustrated in the following figures improves releasing of the brake pad 1 away from the brake disk 20, against the above-described pad suction.

FIG. 2 shows a brake pad 1 for a disk brake. It comprises a backplate 2 which holds a friction layer 3 having a friction surface 4 that is configured for engaging with a brake disk 20. The friction layer 3 has a pressure groove 10 extending from a leading edge 5 of the friction layer 3. The pressure groove 10 is closed laterally and a trailing side 13, i.e. the pressure groove 10 is delimited by the friction surface 4 on an outer circumferential side 11 and on an inner circumferential side 12 and on the trailing side 13. The pressure groove 10 is open on a leading side 14.

The pressure groove 10 extends over more than 10% and less than 50% of a length of the friction surface 4, which length is measured from the leading edge 5 to a trailing edge 6.

The pressure groove 10 has a width of approximately a quarter of a width of the friction surface 4, the width of the friction surface 4 being measured from an inner circumferential edge to an outer circumferential edge thereof.

The pressure groove 10 is arranged approximately centrally between an outer circumferential edge and an inner circumferential edge of the friction layer 3.

The brake pad 1 has a leading chamfer 7 and a trailing chamfer 8 for adjusting NVH.

FIGS. 3*a* through 3*c* show processes of releasing the brake pad 1 according to the application from a brake disk 20, which is aided by the pressure conditions created by the pressure groove 10.

The leading side of the brake pads is defined by rotation of the brake disk 20, as indicated by the arrow. The brake disk has a preferred rotating direction (corresponding for instance to a forward motion of a vehicle in which it is used). The preferred rotating direction allows the definition of the leading edge 5 or side of the brake pad 1 (right side in FIGS. 3*a-c*) and trailing edge 6 or side of the brake pad 1 (left side in FIGS. 3*a-c*).

In the case of FIG. 3*a* the pressure groove 10 extends approximately up to a center of the friction surface 4 and is thus long enough to create a pressure with a resulting force acting approximately in the center of the brake pad 1, to push it away from the disk 20 and counteract residual drag.

In the case of FIGS. 3*b* and *c*, the brake pad 1 has a shorter pressure groove 10, extending from the leading edge 5 over approximately 25% of a length of the friction surface 4. This has the effect of initiating lifting of the brake pad on the leading side thereof (FIG. 3*b*). This results in slight tilting of the pad which creates a dynamic pressure below the complete friction surface, finally pushing the whole brake pad 1 away from the brake disk (FIG. 3*c*).

FIG. 4*a* shows a brake pad 1 with a pressure groove 10 in three different views (top: horizontal cut, bottom left: view onto the friction layer 3, bottom right: side view onto the leading side). A base surface 15 of the pressure groove 10 is parallel to the friction surface 4, such the pressure groove 10 has a constant depth (apart from a portion of the pressure groove 10 which extends in an area of a leading chamfer 7, where the depth is diminished accordingly, due to the chamfer 7). The pressure groove 10 has a step profile on both circumferential sides 11, 12, and on the trailing side 13.

FIG. 4*b* shows a brake pad 1 in the same views as in the case of FIG. 4*a*. The base surface 15 is sloped at a constant angle with respect to the friction surface 4. The pressure groove 10 has thus a continuously decreasing depth from the open leading side 14 towards the trailing side 13, on which it is closed by the friction layer 3.

FIG. 4*c* also shows the same views of a brake pad 1. In this brake pad 1, the base surface 15 of the pressure groove 10 is also sloped with respect to the friction surface 4. This pressure groove 10 furthermore has chamfered side areas 16 at its inner circumferential side 12 and at its outer circumferential side 11. In those chamfered side areas 16, the depth of the pressure groove 10 decreases continuously towards the respective side.

Such chamfered side areas 16 may also be provided in pressure grooves whose base surface 15 is not sloped from the leading side to the trailing side.

The pressure grooves 10 of FIGS. 4*a* through *c* extend, in each case, in a tangential or horizontal direction from the leading edge 5 towards a trailing edge 6. Pressure grooves of the types shown in FIGS. 4*a* through *c* may instead extend at an angle, as depicted in FIGS. 5*a* through *c*.

FIG. 5*a* shows a brake pad 1 in two different views (left: view onto the friction layer 3, right: side view onto the leading side). Therein, the pressure groove 10 extends at an angle with respect to the horizontal, tangential direction. The pressure groove 10 extends from the leading edge towards the center of the brake pad 1, wherein the pressure groove 10 is slanted circumferentially inward, slightly towards the inner circumferential edge. At the leading edge, the pressure groove 10 commences circumferentially outward with respect to a circumferential center of the friction layer 3.

FIG. 5*b*, by comparison, shows a horizontally, i.e., tangentially extending pressure groove 10. It starts at the leading edge, at the circumferential center of the friction layer 3, and extends towards the center of the brake pad.

FIG. 5*c* shows a brake pad 1, wherein the pressure groove 10 extends at an angle with respect to the tangential direction. The pressure groove 10 extends from the leading edge towards the center of the brake pad 1, wherein the pressure groove 10 is slanted circumferentially outward, slightly towards the outer circumferential edge. At the leading edge, the pressure groove 10 commences circumferentially inward with respect to the circumferential center of the friction layer 3.

The pressure grooves 10 of the types shown in FIGS. 5*a* through *c* may in some embodiments be displaced circumferentially outward or inward, as space permits.

The pressure grooves 10 of FIGS. 5*a* through *c* may for instance be carried out like either one of the pressure grooves of FIGS. 4*a* through *c*.

What is claimed is:

1. A brake pad for a disk brake, comprising:

a backplate; and a friction layer with a friction surface configured for engaging with a brake disk, wherein the friction layer has a pressure groove, the pressure groove extending from a leading edge of the friction layer to a center of the friction surface, wherein the pressure groove is delimited by an outer circumferential side on the friction surface, an inner circumferential side on the friction surface, and a trailing side, and is open on a leading side and closed on the trailing side, the outer circumferential side and the inner circumferential side formed along in an extension direction of the pressure groove, wherein at least a portion of a base surface of the pressure groove has a flat surface with a constant depth in the extension direction of the pressure groove, and wherein the pressure groove has a chamfered side area that slopes from at least one of the inner circumferential side or the outer circumferential side toward the base surface.

2. The brake pad according to claim 1, wherein the pressure groove extends over at least 10% or at least 20% or at least 30% or at least 40% of a length of the friction surface, the length of the friction surface being measured from the leading edge to a trailing edge.

3. The brake pad according to claim 1, wherein the pressure groove has a width of at least 10% or at least 15% of a width of the friction surface and/or at most 50% or at most 40% of a width of the friction surface, the width of the friction surface being measured from an inner circumferential edge to an outer circumferential edge.

4. The brake pad according to claim 1, wherein at least a portion of the base surface of the pressure groove is parallel to the friction surface.

5. The brake pad according to claim 1, wherein at least a portion of the base surface is sloped with respect to the friction surface.

6. The brake pad according to claim 1, wherein the pressure groove is arranged centrally between an outer circumferential edge and an inner circumferential edge of the friction layer.

7. The brake pad according to claim 1, wherein the pressure groove extends in a tangential direction from the leading edge towards a trailing edge.

8. The brake pad according to claim 1, wherein the pressure groove extends at an angle with respect to a tangential direction, wherein the pressure groove extends from the leading edge angled circumferentially outward, or angled circumferentially inward.

9. The brake pad according to claim 1, wherein the pressure groove extends over at most 80% or at most 70% or at most 60% or at most 50% of a length of the friction surface, the length of the friction surface being measured from the leading edge to a trailing edge.

* * * * *